(12) United States Patent
Wahl

(10) Patent No.: US 7,917,636 B2
(45) Date of Patent: Mar. 29, 2011

(54) SYSTEM AND METHOD FOR DETECTING UNUSED ACCOUNTS IN A DISTRIBUTED DIRECTORY SERVICE

(75) Inventor: Mark Frederick Wahl, Austin, TX (US)

(73) Assignee: Informed Control Inc., Austin, TX (US)

( * ) Notice: Subject to any disclaimer, the term of this patent is extended or adjusted under 35 U.S.C. 154(b) by 308 days.

(21) Appl. No.: 11/893,467

(22) Filed: Aug. 16, 2007

(65) Prior Publication Data

US 2008/0046576 A1 Feb. 21, 2008

Related U.S. Application Data

(60) Provisional application No. 60/838,077, filed on Aug. 16, 2006.

(51) Int. Cl.
*G06F 15/16* (2006.01)

(52) U.S. Cl. .......................... 709/228; 709/203; 709/229

(58) Field of Classification Search .................. 709/203, 709/228, 229
See application file for complete search history.

(56) References Cited

U.S. PATENT DOCUMENTS

| 7,191,192 B2 | 3/2007 | Yellepeddy et al. |
| 7,290,129 B2 * | 10/2007 | Chebolu et al. .............. 713/150 |
| 2005/0193427 A1 * | 9/2005 | John ............................... 726/1 |

FOREIGN PATENT DOCUMENTS

JP 2006244177 A * 9/2006

* cited by examiner

*Primary Examiner* — Yves Dalencourt

(57) ABSTRACT

A distributed information processing system in an enterprise computer network comprising a collection of servers providing a directory service and a directory-enabled access control system is augmented with the ability to detect user accounts in the directory service for users who have not recently authenticated to an application that uses the directory-enabled access control system.

3 Claims, 13 Drawing Sheets

AUTHENTICATOR TABLE

130 {

| AUTHENTICATOR ID | SOURCE ADDRESS | SOFTWARE VERSION | STATUS |
|---|---|---|---|
|  |  |  |  |
|  |  |  |  |

BIND PATTERN TABLE

132 {

| PATTERN ID | SOURCE ADDRESS | BASE DN | MATCH TYPE | STATUS | AUTHENTICATOR ID |
|---|---|---|---|---|---|
|  |  |  |  |  |  |
|  |  |  |  |  |  |

SEARCH PATTERN TABLE

134 {

| PATTERN ID | SOURCE ADDRESS | BIND DN | SEARCH BASE | SEARCH SCOPE | FILTER PATTERN | MATCH TYPE | REQUESTED TYPES | STATUS | AUTHEN-TICATOR ID |
|---|---|---|---|---|---|---|---|---|---|
|  |  |  |  |  |  |  |  |  |  |
|  |  |  |  |  |  |  |  |  |  |

FIG. 4A

ELEMENT SET TABLE

136

| ELEMENT ID | DATE | OPERATION | PATTERN ID | TARGET |
|---|---|---|---|---|
|  |  |  |  |  |
|  |  |  |  |  |

LOG STATUS TABLE

138

| PARSE DATE | CHECKPOINT |
|---|---|
|  |  |

FIG. 4B

SYSTEM AND METHOD FOR DETECTING UNUSED ACCOUNTS IN A DISTRIBUTED DIRECTORY SERVICE

CROSS-REFERENCE TO RELATED APPLICATIONS

This application claims the benefit of PPA Ser. No. 60/838,077 filed Aug. 16, 2006 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

This invention relates generally to management of identity information held in directory servers in enterprise computer networks.

2. Prior Art

A typical identity management deployment for an organization will incorporate a directory service. In a typical directory service, one or more server computers host instances of directory server software. These directory servers implement the server side of a directory access protocol, such as the X.500 Directory Access Protocol (DAP), as defined in the document ITU-T Rec. X.519 "Information technology—Open Systems Interconnection—The Directory: Protocol specifications", or the Lightweight Directory Access Protocol (LDAP), as defined in the document "Lightweight Directory Access Protocol (v3)", by M. Wahl et al of December 1997. The client side of the directory access protocol is implemented in other components of the identity management deployment, such as an identity manager or access manager.

A directory access protocol follows a request-response model of interaction, in which the client establishes a connection to a directory server, and over that connection, sends one or more requests. The directory server processes those requests and sends responses over that connection. The types of requests in a directory access protocol include:

the bind request, in which the client sends its authentication information to the server, the search request, in which the client requests one or more entries in the server's directory information tree be returned, the modify request, in which the client requests that the set of attributes be changed in an entry in the server's directory information tree, and the delete request, in which the client requests that an entry be removed from the server's directory information tree.

In order to provide an anticipated level of availability or performance from the directory service when deployed on server computer hardware and directory server software with limits in anticipated uptime and performance, the directory service often will have a replicated topology. In a replicated topology, there are multiple directory servers present in the deployment to provide the directory service, and each directory server holds a replica (a copy) of each element of directory information. One advantage of a replicated topology in an identity management deployment is that even if one directory server is down or unreachable, other directory servers in the deployment will be able to provide the directory service to other components of the identity management deployment. Another advantage is that directory service query operations in the directory access protocol can be processed in parallel in a replicated topology: some clients can send queries to one directory server, and other clients can send queries to other directory servers.

Some directory server implementations which support the X.500 Directory Access Protocol also support the X.500 Directory Information Shadowing Protocol (DISP), as defined in the document ITU-T Rec. X.519, "Information technology—Open Systems Interconnection—The Directory: Protocol specifications", which specifies the procedures for replication between directory servers that implement the X.500 directory access protocol.

In many large and multinational enterprises, the deployment might incorporate multiple distinct implementations of a directory server, and there may be directory server implementations that are not based on the X.500 protocols. Examples of directory server implementations that are not based on the X.500 protocols include the Microsoft Active Directory, the Sun Java Enterprise System Directory Server, OpenLDAP directory server, and the Novell eDirectory Server. As there is currently no standard replication protocol between directory server implementations from different vendors that are not both implementing the X.500 protocols, synchronization mechanisms are often used in addition to replication protocols in order to maintain the consistency of directory information between directory servers in the deployment. Synchronization products, such as a metadirectory server, are used in enterprise identity management deployments that incorporate directory server implementations from multiple vendors. These synchronization products interconnect these directory servers, and transfer changes made in one directory server to another directory server, so that all directory servers have copies of the data.

A primary component of the information model of a directory server is the directory information tree. The directory information tree comprises a set of one or more directory entries. Each entry has a distinguished name that is unique amongst the entries in the directory information tree. Each entry comprises a set of one or more attributes. Each attribute has an attribute type, and there is at most one attribute in an entry of each attribute type. Each attribute has one or more values. Each entry has an attribute, objectClass, with one or more values that are names of object classes defining the contents of the entry.

A directory schema defines the semantics associated with each object class and attribute type. The schema specifications for an object class include: the attribute types of attributes which must be present in an entry when the entry has that object class, and the attribute types of attributes which may be present in an entry when the entry has that object class. The schema specifications for an attribute type include: the maximum number of values of the type which can be present in an entry, the syntax of the values of the attribute type, and how values of the attribute are compared with each other. The directory schema is represented in the directory as values of the two operational attributes attributeTypes and objectClasses, as described in the document "Lightweight Directory Access Protocol (LDAP): Directory Information Models", by K. Zeilenga, of June 2006.

The choice of schema to use in a directory server is determined by the administrator of the directory server. Some directory server implementations have a single, fixed schema; others are extensible and permit the administrator to add attribute type and object class definitions. Several recommended schemas have been published, including the documents ITU-T X.520|ISO/IEC 9594-6, "The Directory: Selected attribute types", ITU-T X.5211 ISO/IEC 9594-7, "The Directory: Selected object classes", "Definition of the inetOrgPerson LDAP Object Class" by M. Smith of 2000, "Lightweight Directory Access Protocol (LDAP): Directory Information Models" by K. Zeilenga of Jun. 2006, and "Lightweight Directory Access Protocol (LDAP): Schema for User Applications", by A. Sciberras of June 2006. In each of these schemas, a user of directory-enabled applications is represented by a single entry. The set of allowed attributes of the object class for such an entry include an attribute which comprises the authentication credentials of the user, such as the user's password. For example, the 'inetOrgPerson' object class allows the attribute userPassword, which contains the password of the user represented by an object of that class.

A metadirectory, as described in U.S. Pat. No. 7,191,192 B2 to Yellepeddy et al, is a software product which translates the contents of one data repository to be appropriate for use in another repository, in which the data repositories may be directory servers or other forms of databases. One primary use of a metadirectory is the translation of directory entries from one schema to another, for deployments in which two or more implementations of directory servers are present, and the directory servers have fixed incompatible schemas.

A directory proxy server is a specialized server which implements a directory access protocol, typically LDAP, but does not maintain a copy of the directory information tree. Instead, the directory proxy server will forward requests it receives to one or more other directory servers for further processing.

A directory server and a directory proxy server typically generate access logs in a text file or in a relational database, and these access logs have one log record for each request received by the directory server or directory proxy server.

A directory-enabled access control system comprises a set of middleware components which rely upon a directory server to maintain information about the users in an enterprise, in particular each user's authentication credentials and access rights.

Typically, an implementation of a directory-enabled access control system in the prior art will, when a user attempts to authenticate by providing their name and credential, send a search request to a directory server to locate the entry for that user. If an entry is found for that user, then the implementation either may read an attribute containing a credential from the returned directory entry and compare that credential with a credential presented by the user, or the implementation may send a bind request to the directory server to perform the comparison, in which the bind request comprises the distinguished name of the entry and the credential supplied by the user.

3. Objects and Advantages

Some existing implementations of directory-enabled access control systems update a user's directory entry when that user successfully logs in, by sending a modify request to the directory for the entry corresponding to the user. That modify request will cause the directory server to replace an attribute in that user's entry which represents the user's last login time with the current date and time. The limitations of this prior art approach include:

Unlike processing a search or bind request, a directory server processing a modify request must write the change to disk storage, which will increase latency and response time in processing authentication.

Many enterprise directory service deployments have a distributed directory service, in which many directory servers replicate the same content, either through a directory replication protocol such as DISP or through a metadirectory. A directory server which processes a modify request must replicate this change to all other directory servers in the deployment, and this may lead to poor directory server performance and high network utilization when there is a large community of users represented in the database. Furthermore, in deployments implementing multi-master replication (MMR), should two or more modifications be sent to more than one directory server for the same entry, the MMR algorithm implemented by the directory servers may detect a conflict between the modifications, and correct the conflict by replacing the value with a value for the last login date that is not the most recent date among the conflicting values.

Many schemas do not define an attribute for representing a user's last login time.

Since, as a search request or a bind request does not update the target user's entry, when directory-enabled access control systems that only send search and bind requests (and no modify requests) to the directory to authenticate a user are part of a deployment, it is not possible to read from a user's entry any attribute that would indicate when a user last logged in.

It is an advantage of this invention that it can detect authentication attempts performed by the access control component which are realized as search requests.

It is an advantage of this invention that it does not incorrectly categorize a user as having an inactive account should a network partition prevent the records for authentications from that user at a directory server from being transferred to the unused account detection component.

SUMMARY

This invention defines and implements an approach to determine the last login date and time of a user, and thus determine whether that user's account is still active. In this approach, a log parsing agent collects log information from each directory server and each directory proxy server. The log parsing agent then filters this log information and sends it to a central unused account detection component for aggregation. The unused account detection component uses the aggregated log information to trim a set of directory entries representing all the users in a deployment into a resulting set of entries, which correspond to users with unused accounts.

DRAWINGS—FIGURES

Figure 1:
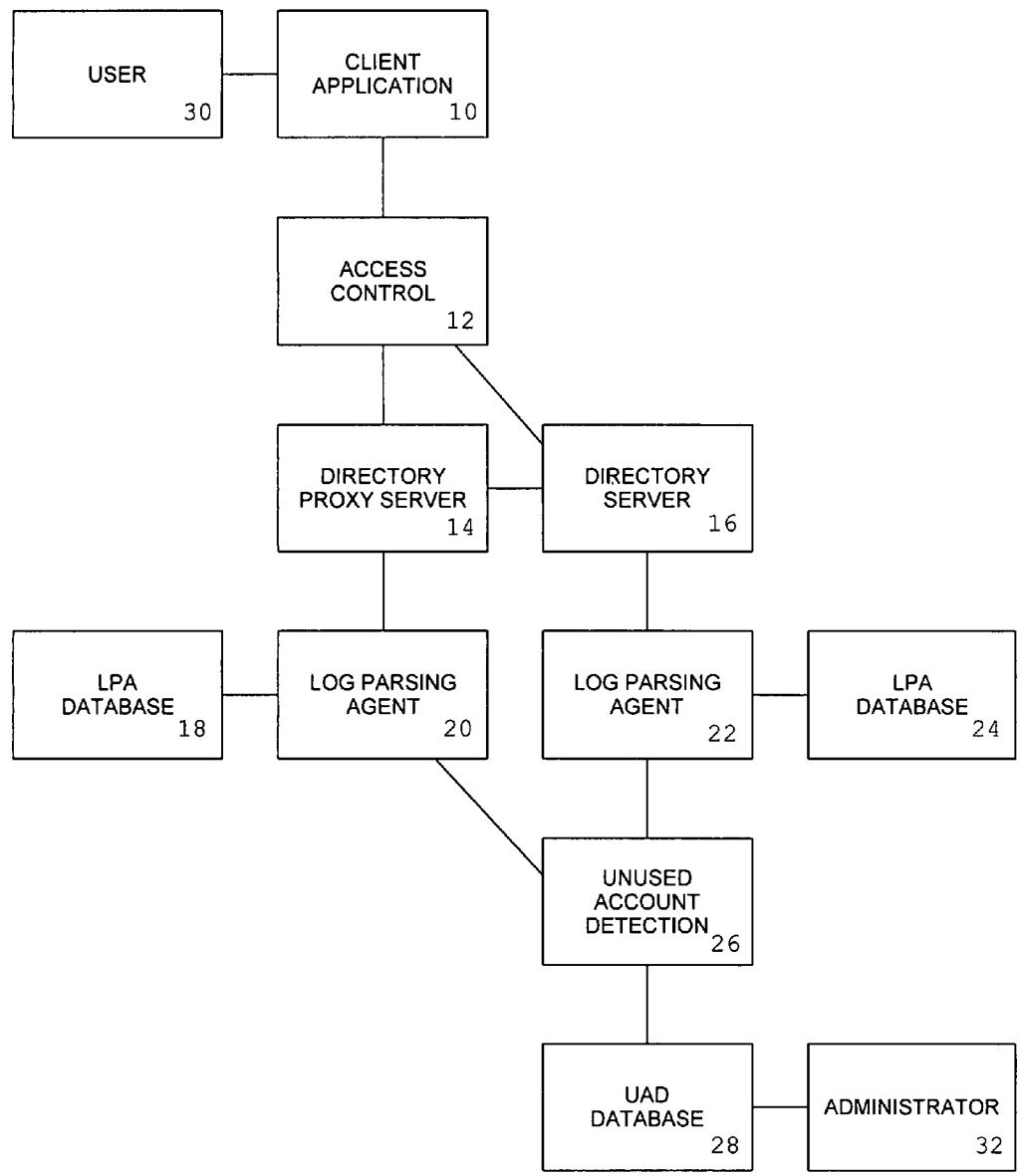
FIG. 1 is a diagram illustrating the components of the system for detecting unused accounts in a distributed directory service.
Figure 2:
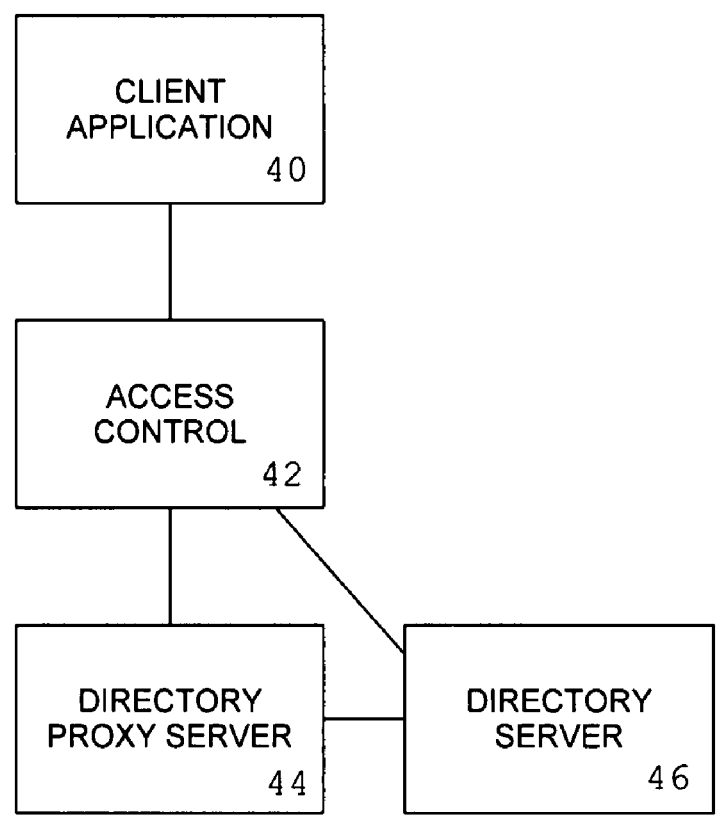
FIG. 2 is a diagram illustrating the prior art components of a directory-enabled access control system.
Figure 3A:
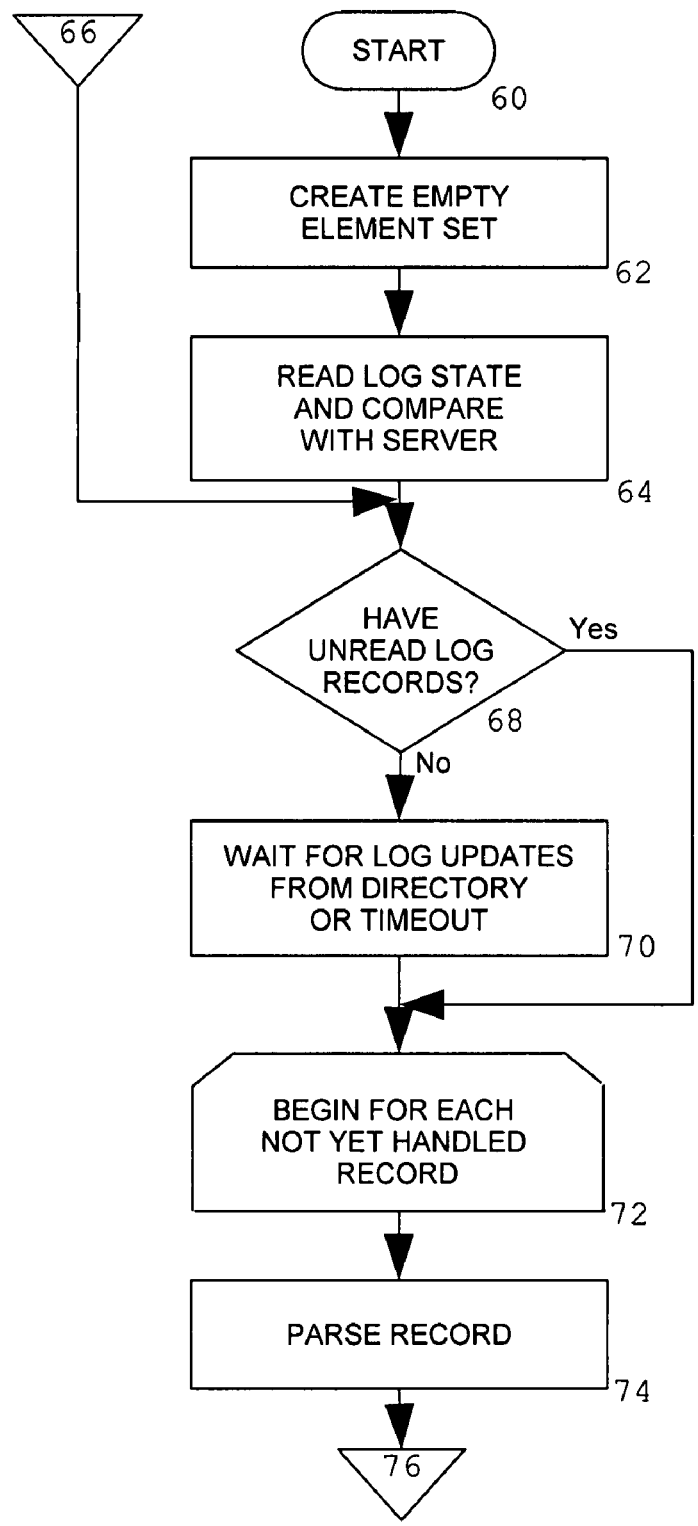
Figure 3B:
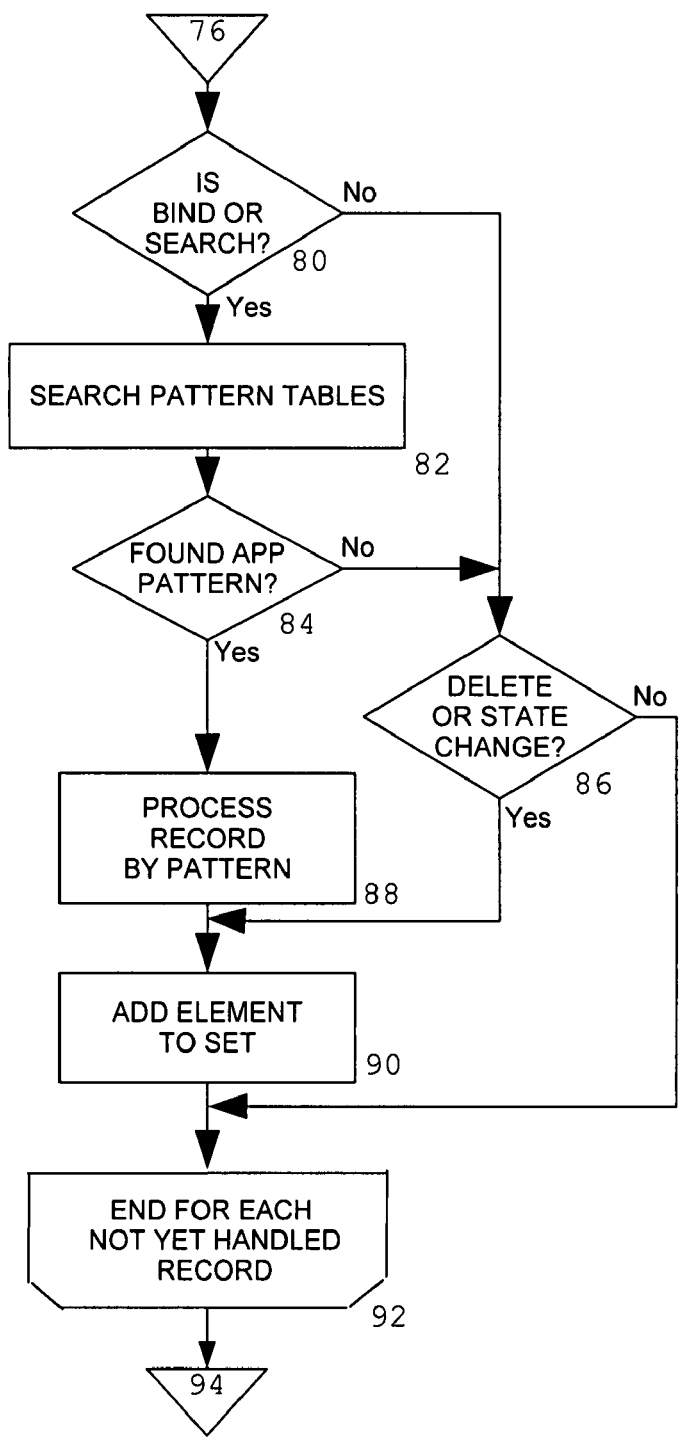
Figure 3C:
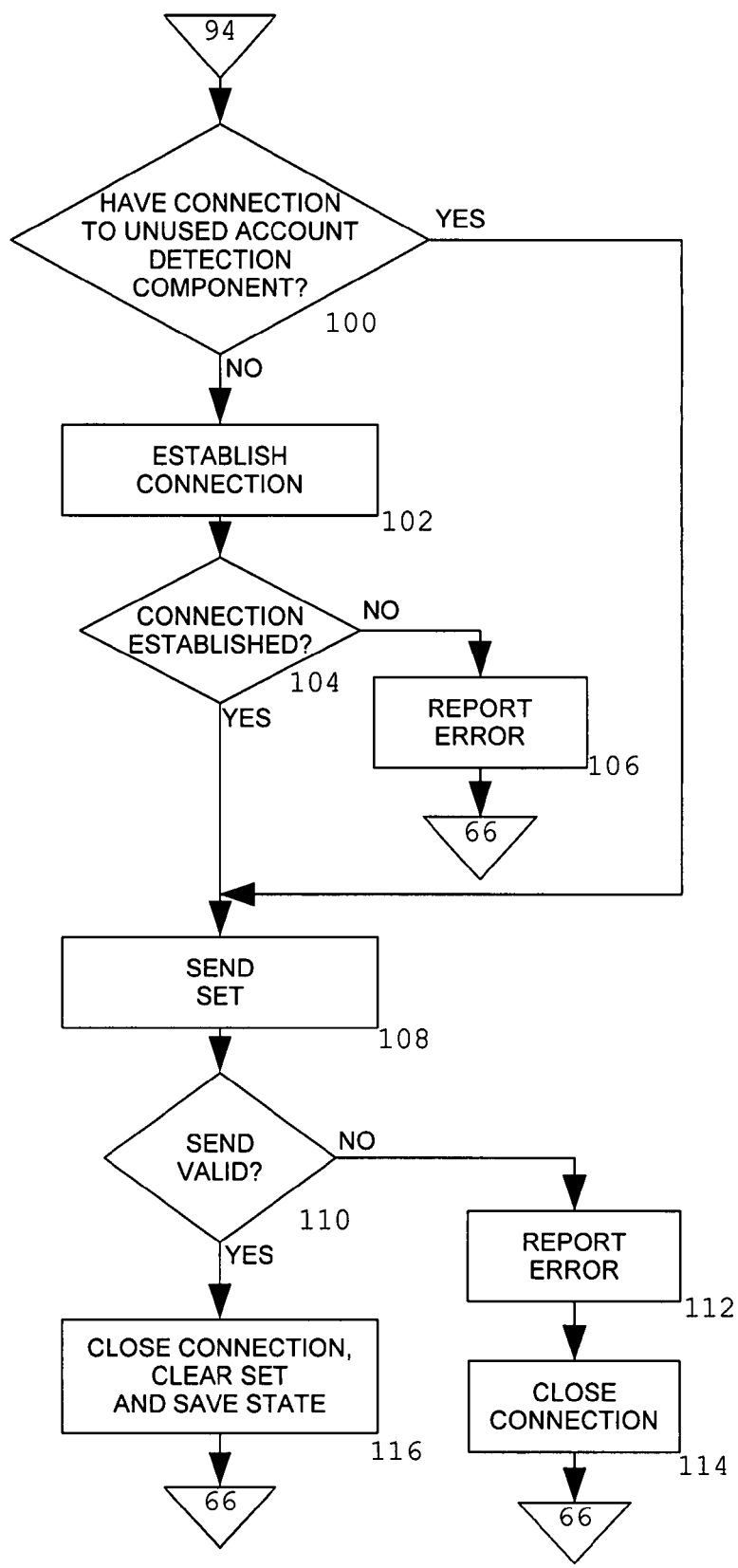

FIG. 3A, FIG. 3B, and FIG. 3C are a flowchart that illustrates the algorithm used in a log parsing agent component.

FIG. 4A and FIG. 4B are a diagram that illustrates the contents of a LPA database component.

Figure 5A:
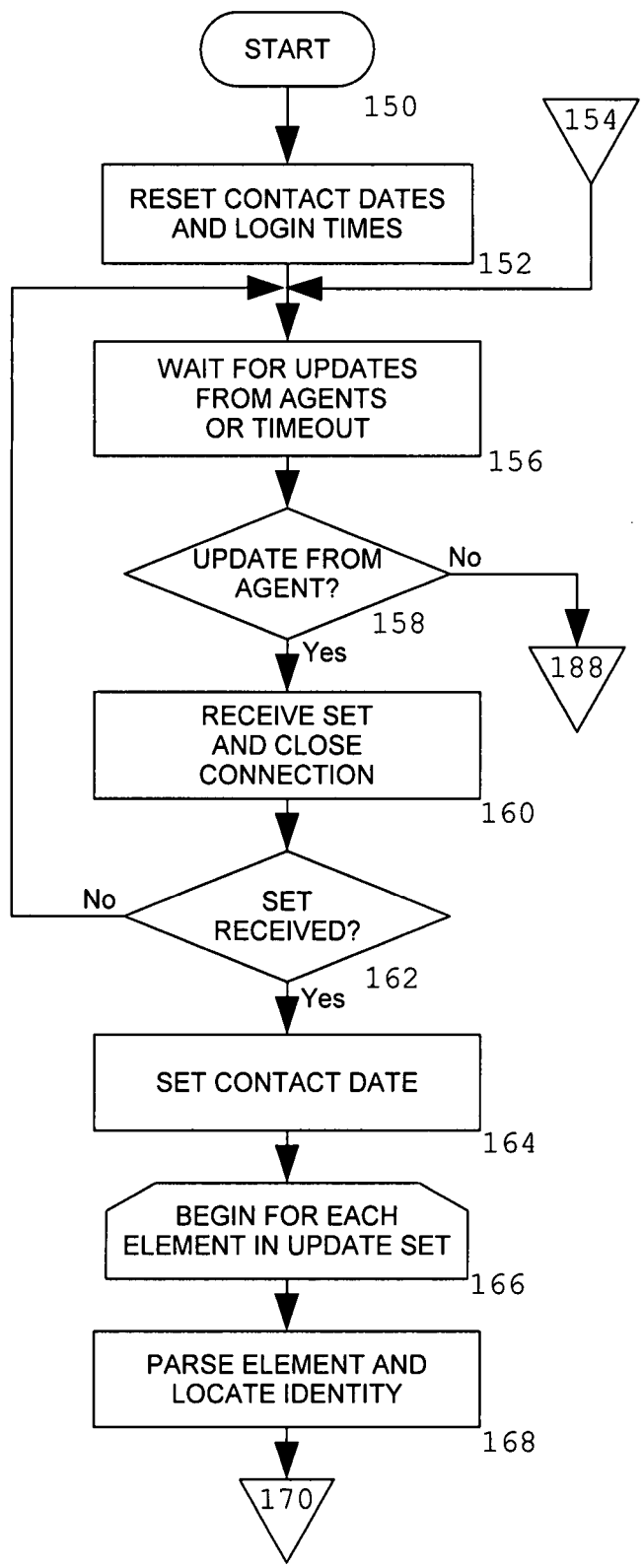
Figure 5B:
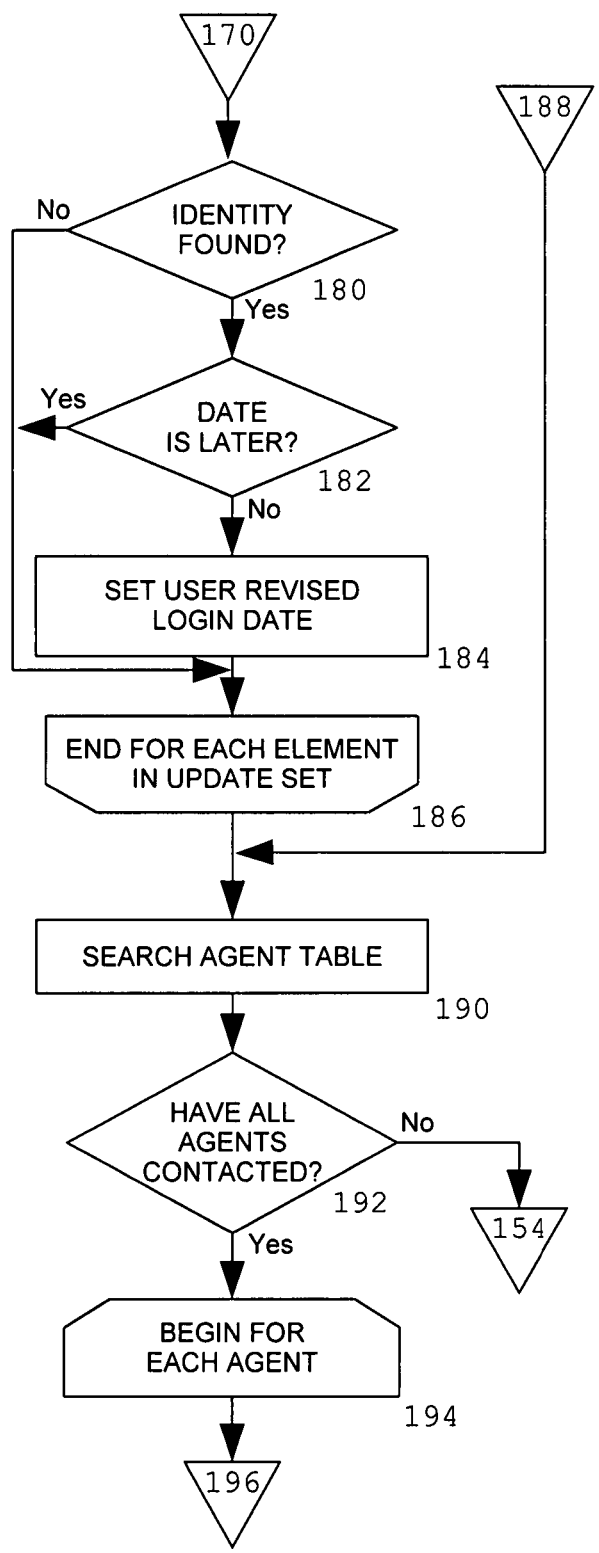
Figure 5C:
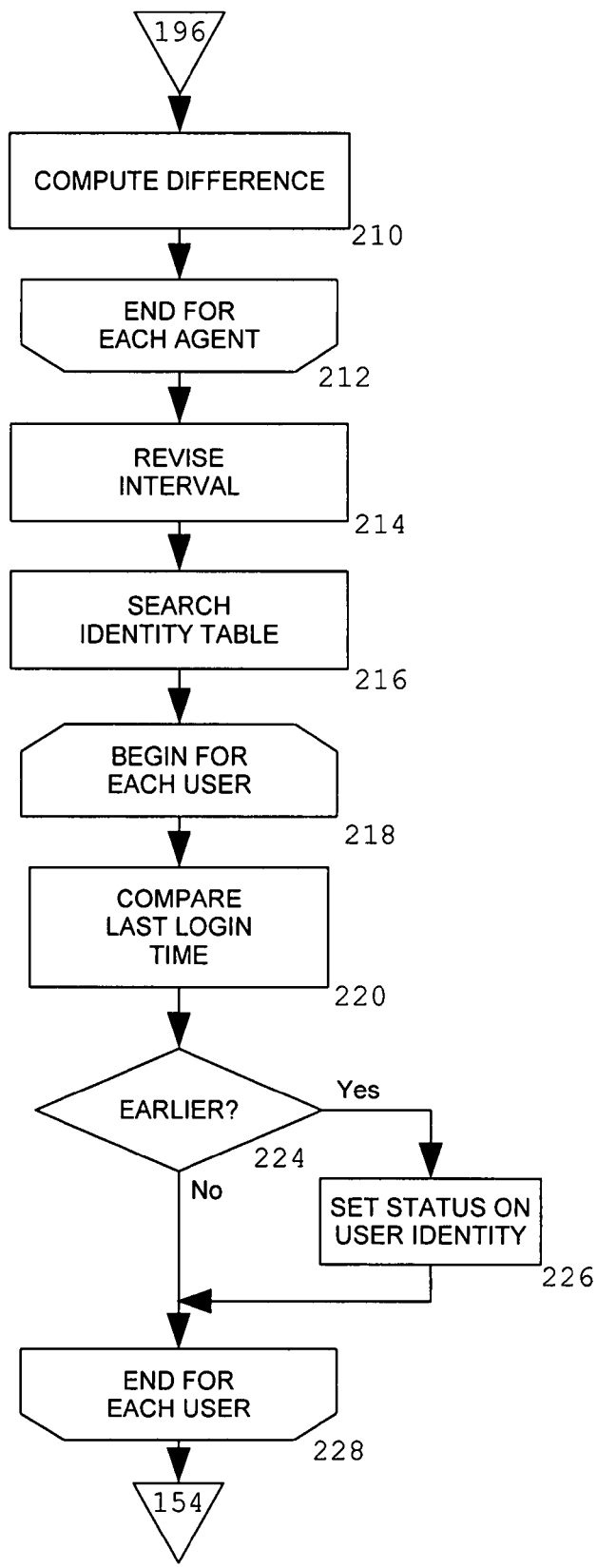

FIG. 5A, FIG. 5B and FIG. 5C are a flowchart that illustrates the algorithm used in an unused account detection component.

Figure 6:
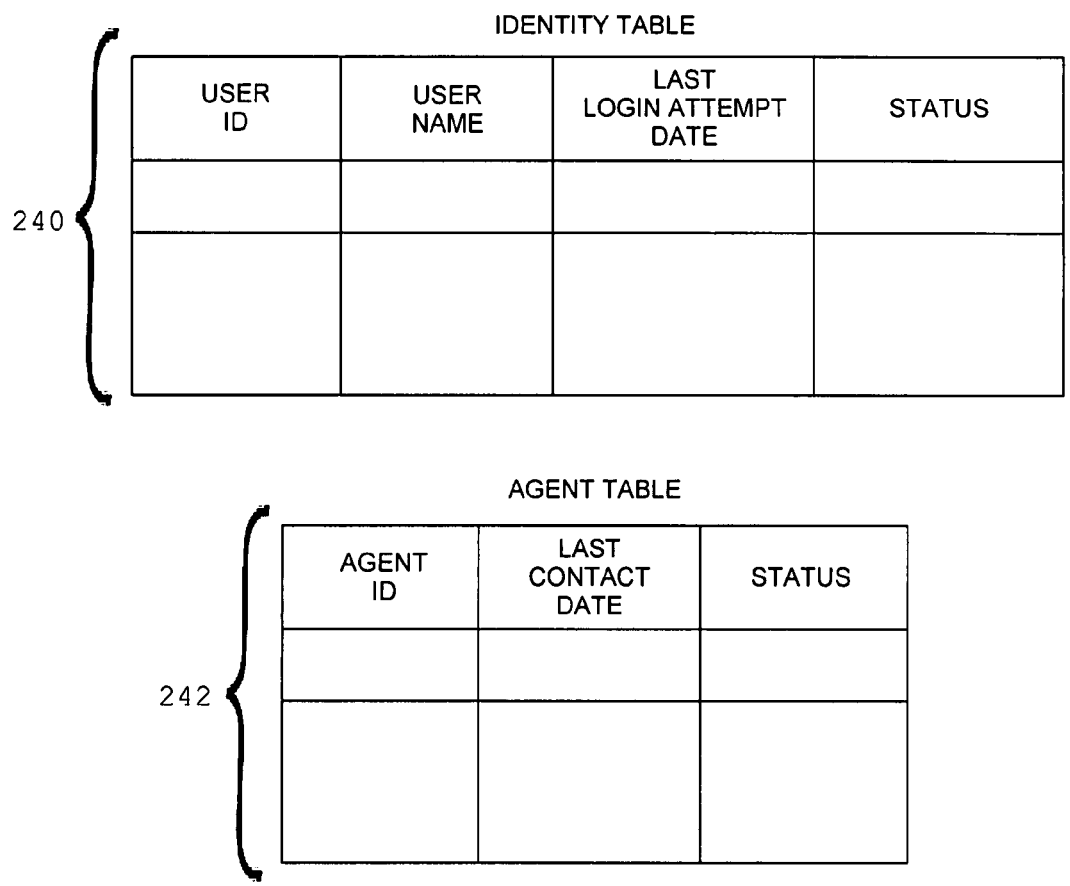

FIG. 6 is a diagram that illustrates the contents of a UAD database component.

Figure 7:
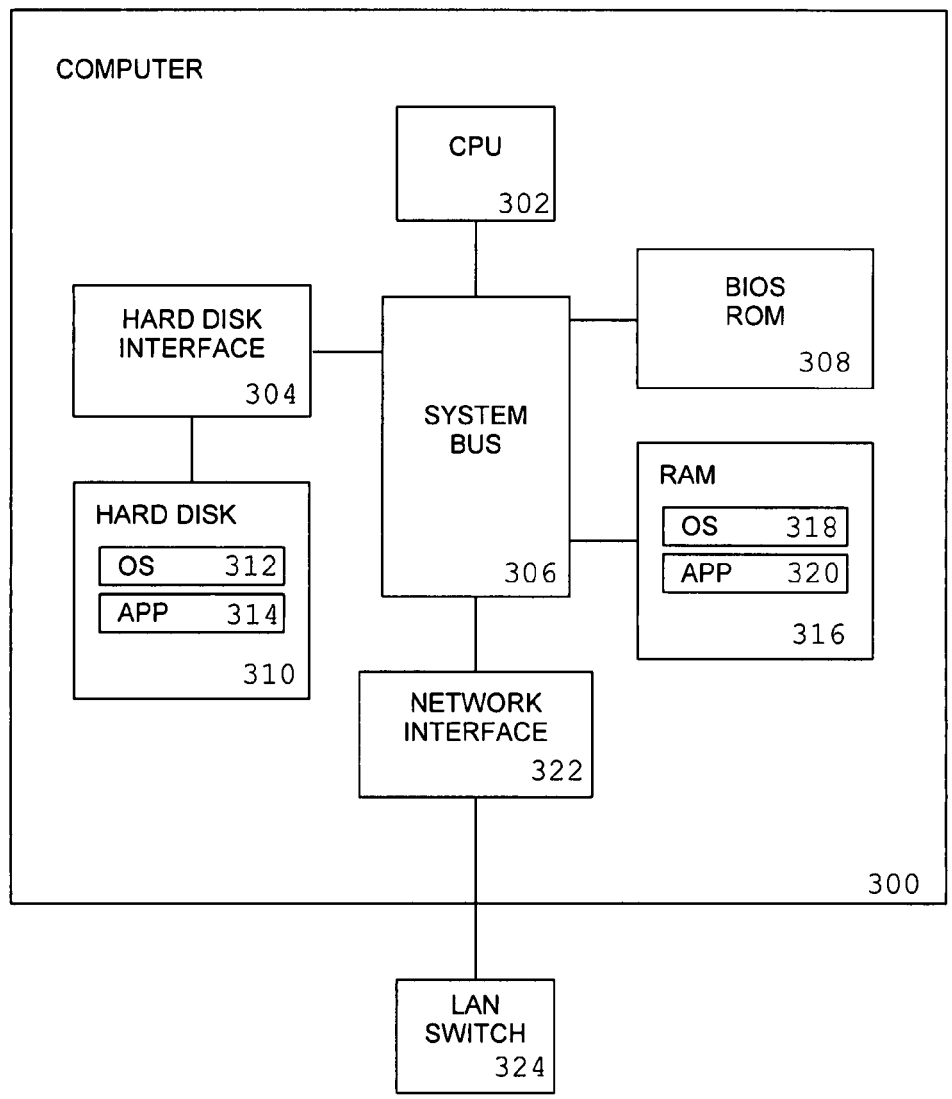

FIG. 7 is a diagram illustrating the typical components of a server computer.

Figure 8:
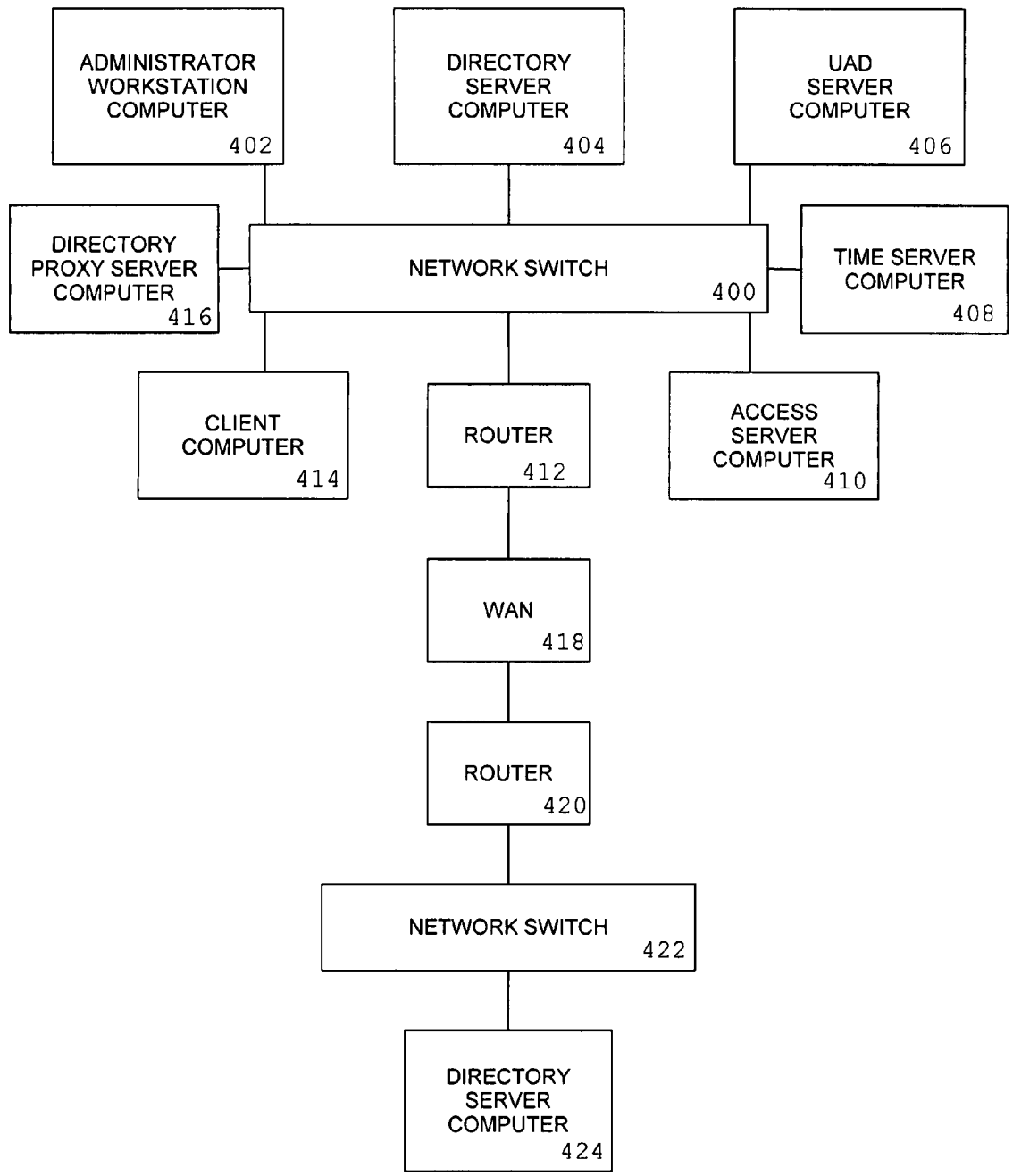

FIG. 8 is a diagram illustrating the typical components of an enterprise network and computer systems of a directory-enabled access control system deployment that spans multiple physical locations.

REFERENCE NUMERALS 10 client application component
12 access control component
14 directory server component
16 directory server component
18 LPA database component
20 log parsing agent component
22 log parsing agent component
24 LPA database component
26 unused account detection component
28 UAD database component
30 user
32 administrator
40 client application component
42 access control component
44 directory server component
46 directory server component
130 authenticator table
132 bind pattern table
134 search pattern table
136 element set table
138 log status table
240 identity table
242 agent table
300 server computer
302 CPU
304 hard disk interface
306 system bus
308 BIOS ROM
310 hard disk
312 operating system software and state stored on hard disk
314 application software and state stored on hard disk
316 RAM
318 operating system software and state in RAM
320 application software and state in memory
322 network interface
324 LAN switch
400 network switch
402 administrator workstation computer
404 directory server computer
406 UAD server computer
408 time server computer
410 access server computer
412 router
414 client computer
416 directory proxy server computer
418 WAN
420 router
422 network switch
424 directory server computer

DETAILED DESCRIPTION

The invention comprises the following components:
a client application component (10),
an access control component (12),
a directory proxy server component (14),
a directory server component (16),
a log parsing agent component (20, 22),
an LPA database component (18, 24),
an unused account detection component (26), and
a UAD database component (28).

The client application component (10) is a software component that relies upon an access control component (12) to assist in the process of authenticating the users of the client application. A user will typically begin the authentication process to a client application by providing their userid and an authentication credential, such as their password. The client application component will provide the userid and credential to the access control component via an application programming interface (API), a system call, or a network protocol. The access control component will respond to the client application component with an indication of whether the user has been successfully authenticated.

The access control component (12) is a software component that provides an authentication and access control service to the client application component (10). The access control component will establish connections to one or more directory server (16) or directory proxy server (14) components. In order to authenticate a user who is accessing a client application, the access control component will submit one or more DAP or LDAP requests over these connections, in which the request locates a directory entry for the user, and either validates the user's authentication credential against that directory entry, or retrieves the stored authentication credential from the directory entry.

The directory proxy server component (14) is a software component that forwards requests it receives from the access control component to one or more directory servers for further processing. When the directory proxy server forwards a request to a directory server or receives a response from a directory server, the directory proxy server will write the parameters of the request or response in its access log. The directory proxy server is used in the situation of directory servers which do not generate an access log of search or bind requests. In this situation, a directory proxy server can be placed between the access control and the directory server, and the directory proxy server will be configured to generate the access log.

The directory server component (16) is a software component that implements the server side of a directory access protocol, such as DAP or LDAP. The directory server component maintains a directory information tree of one or more directory entries. Each user of a client application is represented by a directory entry in the directory information tree.

The log parsing agent component (20, 22) is a software component that collects and processes access log information. A log parsing agent is installed on each server computer where a directory server or directory proxy server is installed, to collect access log information from that directory server or directory proxy server. The log parsing agent retrieves patterns from the LPA database (18, 24), which is configured with a set of patterns that indicate the forms of bind and search operations generated by the access control component when it authenticates a user. Each log parsing agent has access to a pattern for each directory-enabled access control component present in the deployment that relies upon the directory server or directory proxy server whose log is monitored by that log parsing agent. The behavior of the log parsing agent component is illustrated by the flowchart of FIG. 3A, FIG. 3B and FIG. 3C.

The LPA database component (18, 24) is a software component that maintains the persistent state of the log parsing agent component. The LPA database can be implemented as a relational database, which comprises five tables: the authenticator table (130), the bind pattern table (132), the search pattern table (134), the element set table (136) and the log status table (138). The structure of these tables is illustrated by the diagrams of FIG. 4A and FIG. 4B.

There is one row in the authenticator table (130) for each access control component (12) in the deployment. Rows in this table are created by the administrator. The primary key of this table is the AUTHENTICATOR ID column. The columns of this table are:
- AUTHENTICATOR ID: a unique identifier for the access control component,
- SOURCE ADDRESS: the network address, such as an Internet Protocol (IP) address of the server computer where the access control component is installed,
- SOFTWARE VERSION: an identifier for the software package and version which implements the access control component, and
- STATUS: an indication of the configured status of the access control component.

Examples of values used in the STATUS column in rows in the authenticator table (130) include "disabled", to indicate that the access control component has been temporarily disabled, and "deleted", to indicate that the access control component has been permanently disabled. A NULL value in the STATUS column indicates that access control component is active.

There is one row in the bind pattern table (132) for each access control component in the deployment which uses a bind request to authenticate a client. Rows in this table are created by the administrator. The primary key of this table is the PATTERN ID column. The columns of this table are:
- PATTERN ID: a unique identifier for the pattern,
- SOURCE ADDRESS: either the network address, such as an Internet Protocol (IP) address of the server computer where the access control component using this pattern is installed, or NULL if there are multiple server computers on which an access control component using this pattern is installed,
- BASE DN: a distinguished name of the subtree of the directory information tree in which the entries for users are located,
- MATCH TYPE: the attribute type of the attribute value assertion in the least significant component of the distinguished name supplied in the bind request, for which the assertion value is the userid of the user,
- STATUS: an indication of the configured status of this pattern; a NULL value indicates this pattern is active, and
- AUTHENTICATOR ID: a unique identifier for the access control component.

There is one row in the search pattern table (134) for each access control component in the deployment which uses a search request to authenticate a client. Rows in this table are created by the administrator. The primary key of this table is the PATTERN ID column. The columns of this table are:
- PATTERN ID: a unique identifier for the pattern,
- SOURCE ADDRESS: either the network address, such as an Internet Protocol (IP) address of the server computer where the access control component using this pattern is installed, or NULL if there are multiple server computers on which an access control component using this pattern is installed,
- BIND DN: either a distinguished name with which the access control component authenticates itself to the directory before performing search operations, or NULL if there are multiple access control components using this pattern,
- SEARCH BASE: either a distinguished name of the baseObject field of the search request sent by the access control component if the search scope is "singleLevel" or "wholeSubtree", or NULL if the search scope is "baseObject",
- SEARCH SCOPE: the search scope in the search request sent by the access control component, one of "baseObject", "singleLevel" or "wholeSubtree",
- FILTER PATTERN: a regular expression matching a string encoding the search filter sent by the access control component,
- MATCH TYPE: the attribute type in an equality match filter in the search filter sent by the access control component, in which the assertion value is the user id of the user being authenticated,
- REQUESTED TYPES: either a set of attribute types in the attributes field of the search request sent by the access control component, or NULL if the attributes field is not relevant to matching the pattern,
- STATUS: an indication of the configured status of this pattern: a NULL value indicates this pattern is active, and
- AUTHENTICATOR ID: a unique identifier for the access control component.

There is one row in the element set table (136) for each record to be transferred to the unused account detection component. Rows are added to and removed from this table by the log parsing agent component. The primary key of this table is the ELEMENT ID column. The columns of this table are:
- ELEMENT ID: a unique identifier for the element,
- DATE: the date and time of the log record,
- OPERATION: an indication of the directory operation represented by this element,
- PATTERN ID: either the unique identifier of the pattern which matched the log record, or NULL if a pattern was not matched, and
- TARGET: the userid of the affected user.

There is one row in the log status table (138). This row is updated by the log parsing agent component. The columns of this table are:
- PARSE DATE: the date and time of the last parse of the directory server or directory proxy server access log, and
- CHECKPOINT: the index into the directory server or directory proxy server access log of the last record read by the log parsing agent component.

The unused account detection component (26) is a software component that receives element sets from one or more log parsing agent components (20, 22) via a network connection. The network connection comprises an application layer protocol exchange, carried within a secure sockets layer session layer protocol exchange which provides encryption, such as the secure sockets layer protocol Transport Layer Security (TLS) protocol described in the document "The Transport Layer Security (TLS) Protocol Version 1.1" by T. Dierks et al of April 2006, carried within the Transmission Control Protocol (TCP) on an Internet Protocol (IP)-based computer network. The unused account detection component updates the UAD database (28) identity and agent tables. The unused account detection component is configured with a time interval for user inactivity, for example 30 days, and a time interval for log parsing agent contact, such as one day. The behavior of this component is illustrated by the flowchart of FIG. 5A, FIG. 5B and FIG. 5C.

The UAD database component (28) is a software component that maintains the persistent state of the unused account detection component. The UAD database can be implemented as a relational database, which comprises two tables:

the identity table (240) and the agent table (242). The structure of these tables is illustrated by the diagram of FIG. 6.

There is one row in the identity table (240) for each user that accesses the client application component. The primary key of this table is the USER ID column. The columns of this table are:

USER ID: a unique identifier for the user,
USER NAME: the name of the user,
LAST LOGIN ATTEMPT DATE: the date and time of the most recent login attempt by that user as known by the unused account detection component, and
STATUS: an indication of the status of the user, one of NULL for an active user account, "inactive" for an inactive user account, "disabled" for an account that has been temporarily disabled by the administrator, and "deleted" for an account that has been deleted by the administrator.

Initially, rows are added to the identity table (240) for each user. In each row, the initial value of the LAST LOGIN ATTEMPT DATE column is set to the current date and time, and the value of the STATUS column is set to NULL.

There is one row in the agent table (242) for each log parsing agent. The primary key of this table is the AGENT ID column. The columns of this table are:

AGENT ID: a unique identifier for the log parsing agent,
LAST CONTACT DATE: the date and time of the last contact received from the log paring agent, and
STATUS: an indication of the status of the log parsing agent.

The processing components of this invention can be implemented as software running on computer systems on an enterprise computer network.

FIG. 8 illustrates an example enterprise computer network. At one site, an administrator workstation computer (402), a directory server computer (404), a UAD server computer (406), a time server computer (408), an access server computer (410), a client computer (414), a directory proxy server computer (416) and a router (412) are attached to a network switch (400). The router (412) at that site connects to another router (420) at a different site via a wide area network (418). At that other site, the router (420) and a directory server computer (424) are connected to a network switch (422). In this enterprise computer network, the client application (10) can be implemented as software running on the client computer (414), the access control component (12) can be implemented as software running on an access server computer (410), the directory proxy server (14) can be implemented as software running on a directory proxy server computer (416), the directory server component (16) can be implemented as software running on the directory server computers (404 and 424), the LPA database (18) and log parsing agent (20) can be implemented as software running on a directory proxy server computer and directory server computers, and the unused account detection component (26) and UAD database (28) can be implemented as software running on the UAD server computer (406). The time server computer (408) communicates with the other computers in the enterprise network using a protocol such as the Network Time Protocol (NTP) to maintain time synchronization.

FIG. 7 illustrates the typical components of a server computer (300). Components of the computer include a CPU (302) a system bus (306), a hard disk interface (304), a hard disk (310), a BIOS ROM (308), random access memory (316), and a network interface (322). The network interface connects the computer to a local area network switch (324). The hard disk (310) stores the software and the persistent state of the operating system (312) and applications (314) installed on that computer. The random access memory (316) holds the executing software and transient state of the operating system (318) and application processes (320).

Operations

The log filtering agent component comprises a single thread of execution. At step 62, the thread will create an empty element set by initializing the element set table (136). At step 64, the thread will read the log checkpoint from the log status table (138) and compare this checkpoint with the access log of the directory server or directory proxy server. At step 68, the thread will test whether there are unread access log records which the log parsing agent has not yet processed. If there are no unprocessed log records, then at step 70 the thread will wait for log updates from the directory server or directory proxy server, or until a timeout period is reached.

At step 72, the thread will traverse each log record in the log of the directory server or directory proxy server that has not yet been handled by the log parsing agent. At step 74, the thread will parse the record from the log. At step 80, the thread will test whether the log record is a bind operation or a search operation. If it is a bind operation, then the thread will search the bind pattern table (132) for a row in which: the value of the SOURCE ADDRESS column, if not NULL, matches the network address of the directory access protocol client, the value of the BASE DN column is a suffix of the distinguished name of the request, the value of the MATCH TYPE column matches an attribute type in the least significant relative distinguished name of the bind request, and the value of the STATUS column is NULL. If it is a search operation, then the thread will search the search pattern table (134) for a row in which: the value of the SOURCE ADDRESS column, if not NULL, matches the network address of the directory access protocol client, the value of the BIND DN, if not NULL, matches the distinguished name by which the client authenticated to the directory server, the value of the SEARCH BASE column, if not NULL, matches the baseObject field of the search request, the value of the SEARCH SCOPE column matches the scope field of the search request, the value of the FILTER PATTERN column matches the filter of the search request, the value of the MATCH TYPE column is an attribute type of an equality filter in the filter in the search request, the value of the REQUESTED TYPES column, if not NULL, matches the value of the attributes field of the search request, and the value of the STATUS column is NULL. At step 84, the thread will test whether one or more rows were found in either the bind pattern table or the search pattern table. If no search was performed or no rows were found, then at step 86 the thread will test whether the operation is a delete operation or an operation, such as a modify, which changes the state of the user. If so, then the thread will continue at step 90. If no search was performed, no rows were found, and the operation is not a delete operation or does not change the state of the user, then the thread will continue at step 92. If the search was performed and one or more rows were found, then at step 88, the thread will process record by pattern to extract the userid of the user being authenticated. At step 90, the thread will add an element to the element set table (136) for the record. After the records have been handled, the thread will continue at step 100.

At step 100, the thread will test whether it has a connection to the unused account detection component. If it does not have a connection, then at step 102 the thread will establish a connection to the unused account detection component. If the connection establishment failed, then at step 106 the thread will report an error, and continue to step 66. At step 108, the thread will send the element set to the unused account detection component over the connection. At step 110, the thread will test whether the unused account detection component successfully received the element set. If the unused account detection component did not successfully receive the element set, then at step 112 the thread will report an error; at step 114 the thread will close the connection, and the thread will continue at step 66. Otherwise, at step 116, the thread will close the connection, clear the element set, and save the log state to the log status table (138). The thread will then continue at step 66.

The unused account detection component (26) has a single thread of execution. At step 152, the thread will set the initial value of the LAST LOGIN ATTEMPT DATE column in each row of the identity table (240) to the current date and time, and set the initial value of the LAST CONTACT DATE column in each row of the agent table (242) to the current date and time. At step 156, the thread will wait, either until a connection is attempted from a log parsing agent, or until a timer event occurs. The timer is set to the log parsing agent contact interval. If a timer event occurred, then the thread will continue at step 190. Otherwise, at step 160, the thread will receive an element set from a log parsing agent over the connection, and then close the connection. If the element set transfer failed, then the thread will loop back to step 156. Otherwise, at step 164 the thread will set the value in the LAST CONTACT DATE column for the row in the agent table (242) for the log parsing agent to the current date and time. At step 166, the thread will traverse the elements in the element set. At step 168, the thread will parse the element, extract the userid of the user from the element, and search the identity table (240) for a row in which that userid matches a value of the USER ID column. At step 180, the thread will test whether a row was found. If a row is found, then at step 182 the thread will test whether the date and time in the value of the LAST LOGIN ATTEMPT DATE in the row is more recent than the date in the element. If an identity is found and the date and time in the row is not more recent than the date and time in the element, then at step 184, the thread will set the value of the LAST LOGIN ATTEMPT DATE column of the row in the identity table to the date and time of the element. At step 186, the thread will loop back to step 168 until all elements of the element set have been processed.

At step 190, the thread will search the agent table (242) for rows in which the value of the STATUS column is NULL. If one or more rows have a value in the LAST CONTACT DATE that is older than the configured log parsing agent interval, then the thread will loop back to step 156. Otherwise, at step 194 the thread will traverse the log parsing agents represented by the rows of the agent table (242). At step 210, the thread will compute the time difference between the current date and time and the last contact date and time of the agent from the value of the LAST CONTACT DATE column. After all the rows for the log parsing agents have been traversed, at step 214, the thread will select the largest of the time differences calculated, add the user inactivity time interval to this largest time difference to form a sum, and set an inactivity date and time to be this sum subtracted from the current date and time. At step 216, the thread will search the identity table (240) for rows in which the value of the STATUS column is NULL. At step 218, the thread will traverse each user record in the identity table. At step 220, the thread will compare the user's last login date and time from the value of the LAST LOGIN ATTEMPT DATE column with the inactivity date and time. At step 224, the thread will test whether the value of the LAST LOGIN ATTEMPT DATE column is earlier than the inactivity date and time. If the value is earlier, then at step 226 the thread will update the row in the identity table by setting the value of the STATUS column to "inactive". At step 228, the thread will loop back until each record has been processed. The thread will then continue at step 154.

CONCLUSIONS

Many different embodiments of this invention may be constructed without departing from the scope of this invention. While this invention is described with reference to various implementations and exploitations, and in particular with respect to systems for monitoring the last login times of users with accounts in a distributed directory service, it will be understood that these embodiments are illustrative and that the scope of the invention is not limited to them.

What is claimed is:

1. A method of determining whether a user account has been recently used within a minimum inactivity time interval in authentication to a client application in a distributed system deployment comprising a plurality of directory servers and a plurality of log parsing agents, said method comprising:

(a) transmitting over a directory access protocol a first request from an access control component connected to said client application to a first directory server wherein said first request comprises a userid parameter identifying said user account, (b) writing by said first directory server of said userid parameter of said first request identifying said user account and a first access time of said first request as a first element to a first access log connected to said first directory server, (c) transmitting over said directory access protocol a second request from said access control component connected to said client application to a second directory server wherein said second request comprises said userid parameter identifying said user account, (d) writing by said second directory server of a second element to a second access log connected to said second directory server wherein said second element comprises said userid parameter of said second request and said second element further comprises a second access time of said second request , (e) establishing a first connection from a first log parsing agent component attached to said first access log to an unused account detection component, (f) updating a first connection time of a first agent record corresponding to said first log parsing agent component in a database attached to said unused account detection component to be a current time at time of said first connection, (g) transmitting over said first connection said first element from said first log parsing agent component to said unused account detection component, (h) updating an access time of an account record corresponding to said user account in said database attached to said unused account detection component with said first access time from said first element transmitted from said first log parsing agent, (i) establishing a second connection from a second log parsing agent component attached to said second access log to said unused account detection component, (j) updating a second connection time of a second agent record corresponding to said second log parsing agent component in said database attached to said unused account detection component to be a current time at time of said second connection, (k) transmitting over said second connection said second element from said second log parsing agent component to said unused account detection component, (l) updating said access time of said account record corresponding to said user account in said database attached to said unused account detection component with said second access time from said second element transmitted from said second log parsing agent if said second access time is later than said first access time, (m) computing an access time difference time interval of said account record between said access time of said account record and a current time at time of computation, (n) computing a first connection time interval for said first log parsing agent as a difference between said current time at time of computation and said first connection time of said first agent record corresponding to said first log parsing agent component in said database attached to said unused account detection component, (o) computing a second connection time interval for said second log parsing agent computed as a difference between said current time at time of computation and said second connection time of said second agent record corresponding to said second log parsing agent component in said database attached to said unused account detection component, (p) computing a minimum connection time interval as a larger value of said first connection time interval and said second connection time interval, (q) comparing said access time difference time interval of said account record with said minimum inactivity time interval and comparing said minimum connection time interval with said minimum inactivity time interval, and (r) determining said user account record as not recently used if said access time difference time interval is greater than said minimum inactivity time interval and said minimum connection time interval is less than said minimum inactivity time interval.

2. A system for determining whether a user account has been recently used within a minimum inactivity time interval in authentication to an application in a distributed system deployment, said system comprising (a) a client application,
(b) an access control component,
(c) a first directory server,
(d) a second directory server,
(e) a first log parsing agent component,
(f) a second log parsing agent component,
(g) an unused account detection component, and
(h) a database attached to said unused account detection component, wherein said client application transmits for a first request an identity of a user to said access control component, said access control component transmits said first request with a userid parameter identifying said user account via a directory access protocol to said first directory server, said first directory server writes a first element to a first access log wherein said first element comprises said userid parameter of said first request and said first element further comprises an access time of said first request, said first log parsing agent component attached to said first access log establishes a first connection to said unused account detection component, said unused account detection component updates a first connection time of a first agent record corresponding to said first log parsing agent component in said database to be a current time at time of first connection, said first log parsing agent component parses said first element from said first access log and transmits over said first connection said first element to said unused account detection component, said unused account detection component updates an access time of an account record corresponding to said user account in said database attached to said unused account detection component with said access time from said first element transmitted from said first log parsing agent, said client application transmits for a second record said identity of a user to said access control component, said access control component transmits said second request with said userid parameter identifying said user account via said directory access protocol to said second directory server, said second directory server writes a second element to a second access log wherein said second element comprises said userid parameter of said second request and said second element further comprises an access time of said second request, said second log parsing agent component attached to said second access log establishes a second connection to said unused account detection component, said unused account detection component updates a second connection time of a second agent record corresponding to said second log parsing agent component in said database to be a current time at time of second connection, said second log parsing agent component parses said second element from said second access log and transmits over said second connection said second element to said unused account detection component, said unused account detection component updates said access time of said account record corresponding to said user account in said database attached to said unused account detection component with said access time from said second element transmitted from said second log parsing agent if said access time from said second element is later than said access time from said first element, said unused account detection component computes an access time difference time interval of said account record between said access time of said account record and a current time at time of computation, said unused account detection component computes a first connection time interval for said first log parsing agent as a difference between said current time at time of computation and said first connection time of said first agent record corresponding to said first log parsing agent component in said database attached to said unused account detection component, said unused account detection component computes a second connection time interval for said second log parsing agent computed as a difference between said current time at time of computation and said second connection time of said second agent record corresponding to said second log parsing agent component in said database attached to said unused account detection component, said unused account detection component computes a minimum connection time interval as a larger value of said first connection time interval and said second connection time interval, said unused account detection component compares said access time difference time interval of said account record with said minimum inactivity time interval and compares said minimum connection time interval with said minimum inactivity time interval, and said unused account detection component determines said user account record as not recently used if said access time difference time interval is greater than said minimum inactivity time interval and said minimum connection time interval is less than said minimum inactivity time interval.

3. A computer program product stored in a non-transitory computer usable medium, said product comprising computer readable instructions executed by a server computer for determining whether a user account has been recently used within a minimum inactivity time interval in authentication to an application in a distributed system deployment comprising a plurality of directory servers and a plurality of log parsing agents, said computer program product comprising:

(a) instructions for transmitting over a directory access protocol a first request from an access control component connected to said client application to a first directory server wherein said first request comprises a userid parameter identifying said user account, (b) instructions for writing by said first directory server of said userid parameter of said first request identifying said user account and a first access time of said first request as a first element to a first access log connected to said first directory server, (c) instructions for transmitting over said directory access protocol a second request from said access control component connected to said client application to a second directory server wherein said second request comprises said userid parameter identifying said user account, (d) instruction for writing by said second directory server of a second element to a second access log connected to said second directory server wherein said second element comprises said userid parameter of said second request and said second element further comprises a second access time of said second request, (e) instructions for establishing a first connection from a first log parsing agent component attached to said first access log to an unused account detection component, (f) instructions for updating a first connection time of a first agent record corresponding to said first log parsing agent component in a database attached to said unused account detection component to be a current time at time of said first connection, (g) instructions for transmitting over said first connection said first element from said first log parsing agent component to said unused account detection component, (h) instructions for updating an access time of an account record corresponding to said user account in said database attached to said unused account detection component with said first access time from said first element transmitted from said first log parsing agent, (i) instructions for establishing a second connection from a second log parsing agent component attached to said second access log to said unused account detection component, (j) instructions for updating a second connection time of a second agent record corresponding to said second log parsing agent component in said database attached to said unused account detection component to be a current time at time of said second connection, (k) instructions for transmitting over said second connection said second element from said second log parsing agent component to said unused account detection component, (l) instructions for updating said access time of said account record corresponding to said user account in said database attached to said unused account detection component with said second access time from said second element transmitted from said second log parsing agent if said second access time is later than said first access time, (m) instructions for computing an access time difference time interval of said account record between said access time of said account record and a current time at time of computation, (n) instructions for computing a first connection time interval for said first log parsing agent as a difference between said current time at time of computation and said first connection time of said first agent record corresponding to said first log parsing agent component in said database attached to said unused account detection component, (o) instructions for computing a second connection time interval for said second log parsing agent computed as a difference between said current time at time of computation and said second connection time of said second agent record corresponding to said second log parsing agent component in said database attached to said unused account detection component, (p) instructions for computing a minimum connection time interval as a larger value of said first connection time interval and said second connection time interval, (q) instructions for comparing said access time difference time interval of said account record with said minimum inactivity time interval and comparing said minimum connection time interval with said minimum inactivity time interval, and (r) instructions for determining said user account record as not recently used if said access time difference time interval is greater than said minimum inactivity time interval and said minimum connection time interval is less than said minimum inactivity time interval.

* * * * *